US012676336B2

(12) United States Patent
Kim

(10) Patent No.: US 12,676,336 B2
(45) Date of Patent: Jul. 7, 2026

(54) BATTERY CELL AND APPARATUS FOR MANUFACTURING THE SAME

(71) Applicants: Hyundai Motor Company, Seoul (KR); Kia Corporation, Seoul (KR)

(72) Inventor: Kyung Mo Kim, Hwaseong-si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 599 days.

(21) Appl. No.: 18/333,919

(22) Filed: Jun. 13, 2023

(65) Prior Publication Data

US 2024/0136565 A1 Apr. 25, 2024
US 2024/0234792 A9 Jul. 11, 2024

(30) Foreign Application Priority Data

Oct. 24, 2022 (KR) .......................... 1020220137128

(51) Int. Cl.
H01M 10/04 (2006.01)
H01M 50/105 (2021.01)

(52) U.S. Cl.
CPC ....... H01M 10/049 (2013.01); H01M 50/105 (2021.01)

(58) Field of Classification Search
CPC .......................... H01M 10/049; H01M 50/105
See application file for complete search history.

(56) References Cited

U.S. PATENT DOCUMENTS

| | | | |
|---|---|---|---|
| 8,974,955 B2 | 3/2015 | Min et al. | |
| 10,121,994 B2 | 11/2018 | Kang | |
| 2010/0203373 A1* | 8/2010 | Kawase | H01M 50/477 |
| | | | 429/94 |
| 2017/0244072 A1* | 8/2017 | Robert | H01M 10/6554 |
| 2023/0238657 A1* | 7/2023 | Lee | H01M 50/593 |
| | | | 429/177 |

FOREIGN PATENT DOCUMENTS

| | | |
|---|---|---|
| JP | 2001-052664 | 2/2001 |
| JP | 2001-110375 | 4/2001 |
| JP | 2002-298797 | 10/2002 |
| JP | 6086210 | 3/2017 |
| KR | 10-2015-0145076 | 12/2015 |
| KR | 10-1753336 | 7/2017 |
| KR | 10-1801232 | 11/2017 |
| KR | 10-2021-0000481 | 1/2021 |

* cited by examiner

*Primary Examiner* — Christopher P Domone
(74) *Attorney, Agent, or Firm* — Fish & Richardson P.C.

(57) ABSTRACT

The present disclosure relates to an apparatus for manufacturing a battery cell. For example, a battery cell includes a casing having two open sides and an auxiliary portion, and an electrode assembly configured to be inserted into the casing. The electrode assembly is manufactured by stacking a positive electrode with a positive electrode tab, a separator, and a negative electrode with a negative electrode tab. The electrode assembly includes a band element surrounding the electrode assembly and including an extended portion.

20 Claims, 31 Drawing Sheets

BATTERY CELL AND APPARATUS FOR MANUFACTURING THE SAME

CROSS-REFERENCE TO RELATED APPLICATION

This application claims, under 35 U.S.C. § 119(a), the benefit of and priority to Korean Patent Application No. 10-2022-0137128, filed on Oct. 24, 2022, the entire contents of which are incorporated herein by reference.

TECHNICAL FIELD

The present disclosure relates to a rechargeable battery and, more particularly, to an apparatus for manufacturing a battery cell.

BACKGROUND

Recently, the use of rechargeable batteries has expanded and is widely used in electronic devices, electric vehicles, energy storage systems, etc. A lithium-ion battery is one of the most widely used rechargeable batteries. A unit cell of the lithium-ion battery is manufactured in such a manner that an electrode assembly in which a positive electrode, a negative electrode, and a separator are assembled and sealed with a casing, such as a prismatic casing, a pouch, and a cylindrical casing.

By way of example, as illustrated in FIG. 1A, a positive electrode 2 and a negative electrode 4 cut to have a predetermined area can be prepared, and a separator 6 can be folded to have a Z shape. The positive electrode 2 and the negative electrode 4 are alternately inserted in the folded separator 6 to manufacture an electrode assembly 1. As shown in FIG. 1B, the assembled electrode assembly 1 is coupled to a lead terminal 3 by welding or the like, and then the electrode assembly 1 is disposed in a casing 5. Referring to FIG. 1C, the casing 5 has four sides, and two or three thereof are primary sealing sides 5a. Here, the primary sealing sides 5a are sealed, and then electrolyte E is injected into the casing 5 through a temporary sealing side 5b, which is a remaining one of the four sides. Thereafter, the temporary sealing side 5b of the casing 5 through which the electrolyte E is injected is sealed (see FIG. 1D). On the cell sealed in the above described manner, an activation process and a degassing process are performed, and a final sealing side 5c is sealed (see FIG. 1E). A portion of the casing 5 between the temporary sealing side 5b and the final sealing side 5c is cut, thereby completing manufacture of the pouch-type battery cell (see FIGS. 1F and 1G). Conventionally, when manufacturing the pouch-type battery cell, four sides of the casing were sealed. When the number of sealing sides of the casing is reduced, possibility of electrolyte leakage that may occur due to damage to the sealing sides may be reduced. In addition, the edge portion of the cell may be cooled, thereby increasing cooling efficiency when cells are vertically stacked in a battery system.

SUMMARY OF THE DISCLOSURE

The present disclosure has been made in an effort to solve the above-described problems associated with the prior art, and it is an object of the present disclosure to provide an apparatus for manufacturing a battery cell capable of manufacturing a battery cell having only two sealing sides.

Another object of the present disclosure is to provide an apparatus for manufacturing a battery cell capable of reducing the possibility of electrolyte leakage by reducing the number of sealing sides.

Still another object of the present disclosure is to provide an apparatus for manufacturing a battery cell capable of increasing cooling efficiency.

The objects of the present disclosure are not limited to the above-mentioned objects, and other objects not mentioned herein will be clearly understood by those of ordinary skill in the art to which the present disclosure pertains (hereinafter, "those skilled in the art") based on the description below.

In one aspect, a battery cell includes a casing having two open sides and an auxiliary portion, and an electrode assembly configured to be inserted into the casing. Here, the electrode assembly is manufactured by stacking a positive electrode with a positive electrode tab, a separator, and a negative electrode with a negative electrode tab. The electrode assembly includes a band element surrounding the electrode assembly and including an extended portion.

In another aspect, the present disclosure provides an apparatus for manufacturing the battery cell, the apparatus including a guide unit having the electrode assembly disposed therein, an expansion unit located next to the guide unit and having the casing disposed therein, and an insertion unit connected to the electrode assembly and configured to insert the electrode assembly into the expansion unit.

Other aspects and preferred implementations of the disclosure are discussed infra.

It is to be understood that the term "vehicle" or "vehicular" or other similar terms as used herein are inclusive of motor vehicles in general, such as passenger automobiles including sport utility vehicles (SUV), buses, trucks, various commercial vehicles, watercraft including a variety of boats and ships, aircraft, and the like, and include hybrid vehicles, electric vehicles, plug-in hybrid electric vehicles, hydrogen-powered vehicles, and other alternative fuel vehicles (e.g. fuels derived from resources other than petroleum). As referred to herein, a hybrid vehicle is a vehicle that has two or more sources of power, for example, a vehicle powered by both gasoline and electricity.

The above and other features of the disclosure are discussed infra.

BRIEF DESCRIPTION OF THE DRAWINGS

The above and other features of the present disclosure will now be described in detail with reference to certain exemplary implementations thereof illustrated in the accompanying drawings which are given hereinbelow by way of illustration only, and thus are not limitative of the present disclosure, and wherein.

Figure 1A:
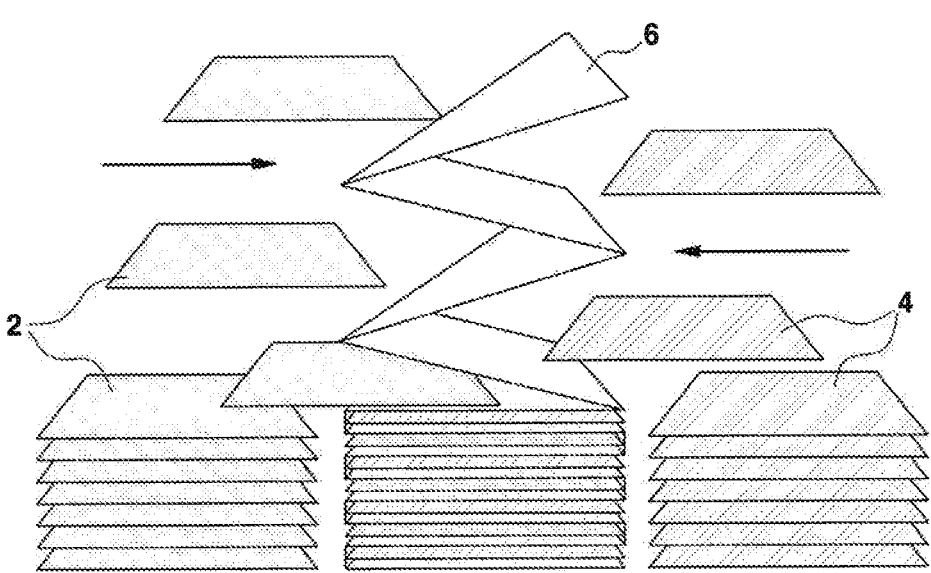
FIGS. 1A to 1G illustrate a process of manufacturing a pouch-type battery cell.
Figure 1B:
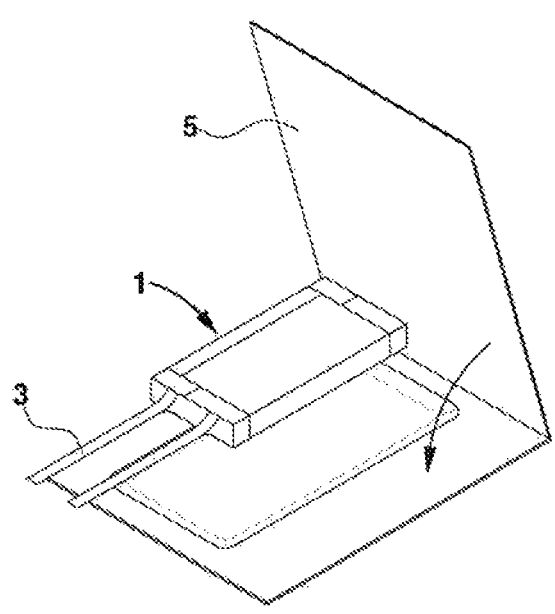
Figure 1C:
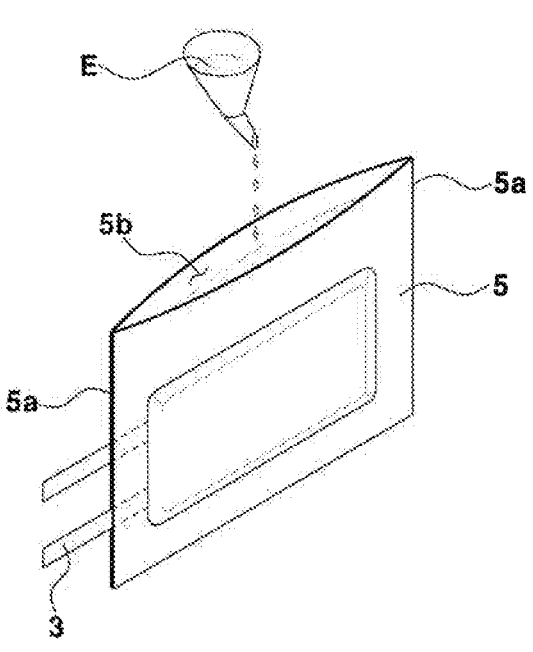
Figure 1D:
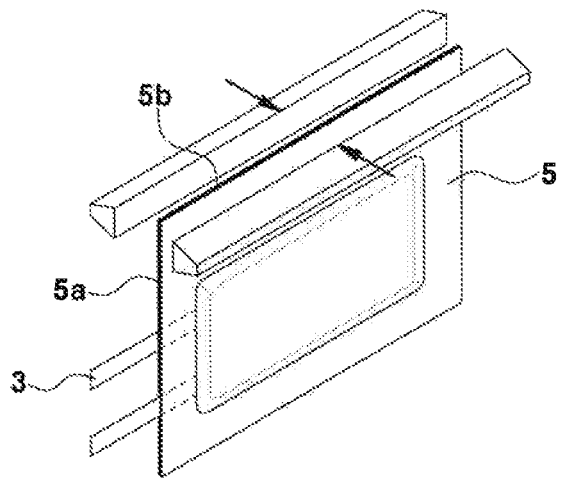
Figure 1E:
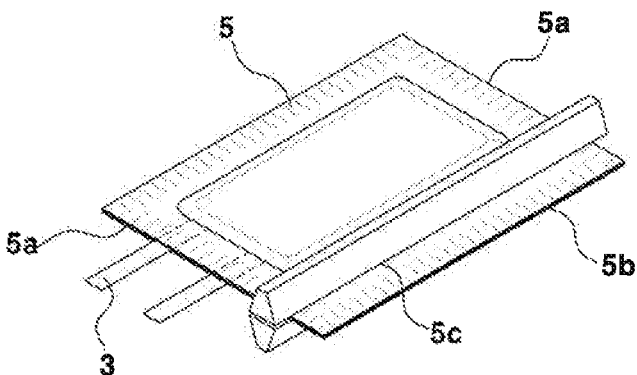
Figure 1F:
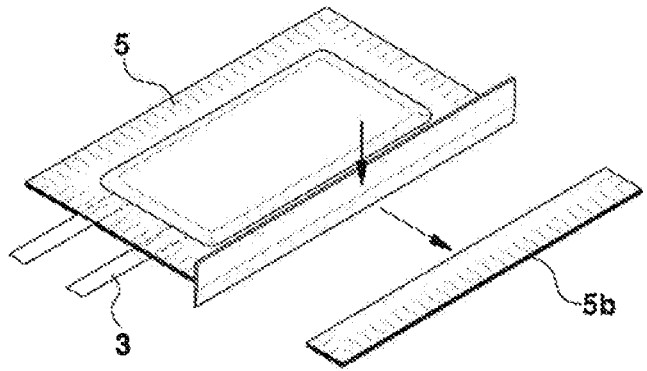
Figure 1G:
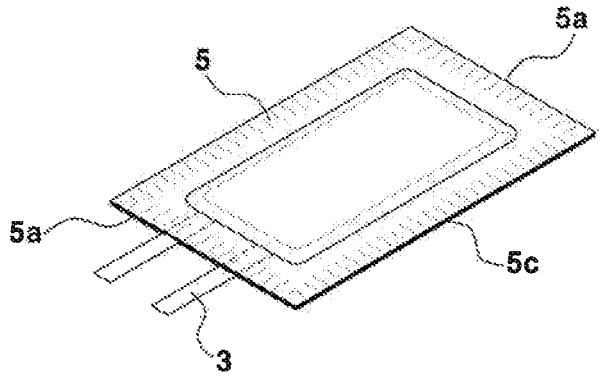

It should be understood that the appended drawings are not necessarily to scale, presenting a somewhat simplified representation of various preferred features illustrative of the basic principles of the disclosure. The specific design features of the present disclosure as disclosed herein, including, for example, specific dimensions, orientations, locations, and shapes, will be determined in part by the particular intended application and usage environment.

In the figures, the reference numbers refer to the same or equivalent parts of the present disclosure throughout the several figures of the drawing.

DETAILED DESCRIPTION

Descriptions of specific structures or functions presented in the implementations of the present disclosure are merely exemplary for the purpose of explaining the implementations according to the concept of the present disclosure, and the implementations according to the concept of the present disclosure may be implemented in various forms. In addition, the descriptions should not be construed as being limited to the implementations described herein, and should be understood to include all modifications, equivalents and substitutes falling within the idea and scope of the present disclosure.

Hereinafter, the present disclosure will be described in detail with reference to the accompanying drawings.

An apparatus 100 for manufacturing a battery cell according to the present disclosure may insert an electrode assembly 20 into a casing 40 of a pouch-type cell. Particularly, the apparatus 100 for manufacturing the battery cell may insert the electrode assembly 20 into the casing 40 without manual intervention of a worker.

As in FIG. 1A, the electrode assembly 20 includes a plurality of positive electrodes 2 and negative electrodes 4 alternately stacked with a separator 6 interposed therebetween. The positive electrode 2 includes a positive electrode active material and a positive electrode current collector. The negative electrode 4 includes a negative electrode active material and a negative electrode current collector. In addition, the positive electrode 2 is provided with a positive electrode tab 22, and the negative electrode 4 is provided with a negative electrode tab 24. The positive electrode tab 22 and the negative electrode tab 24 are coupled to a positive electrode lead 32 and a negative electrode lead 34, respectively. The tabs 22, 24 and the leads 32, 34 may be coupled to each other by welding or the like.

Figure 2:
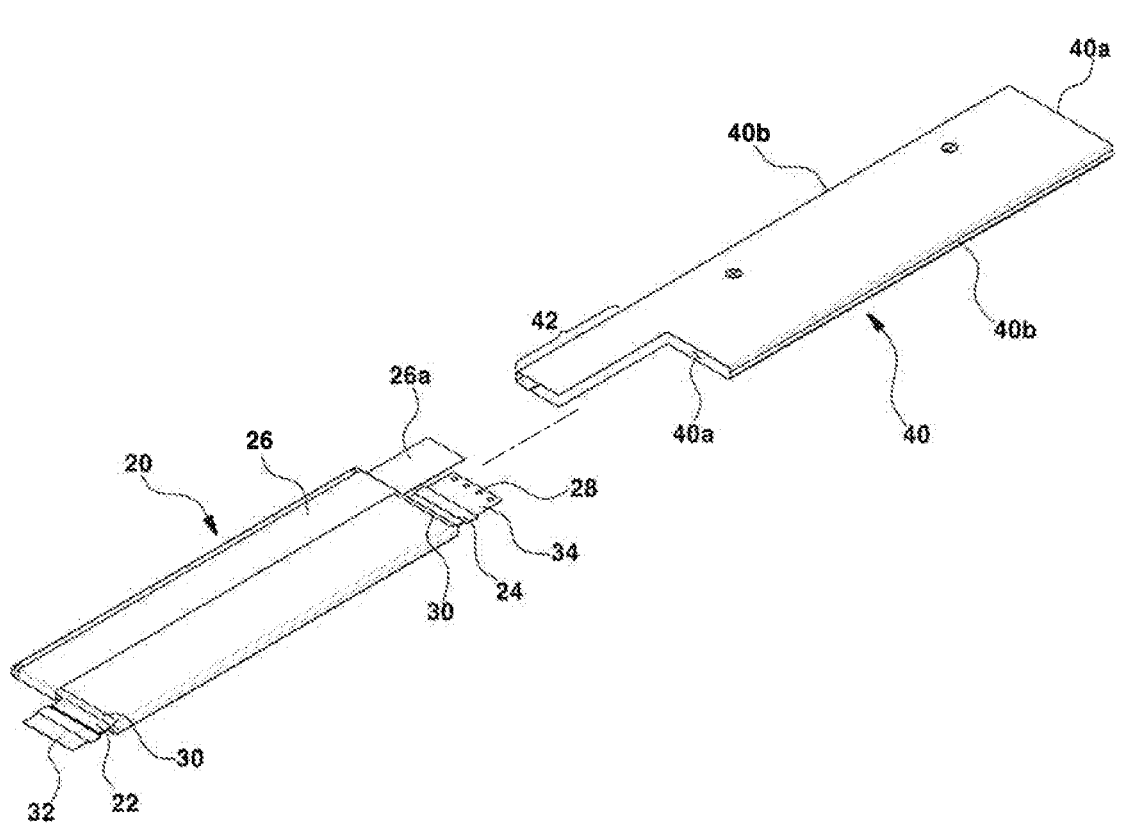
FIG. 2 is an exploded perspective view of an example battery cell according to an implementation of the present disclosure.

As illustrated in FIG. 2, according to the present disclosure, the electrode assembly 20 includes a band element 26. The band element 26 may be attached to surround a portion in which the positive electrode 2, the negative electrode 4, and the separator 6 of the electrode assembly 20 are stacked to provide fixing force, and the band element 26 may have adhesive force.

The band element 26 may be disposed parallel to a direction in which the tabs 22, 24 protrude The band element 26 may protrude farther than the length of the electrode assembly 20. Particularly, the band element 26 may have an end portion 26a protruding farther than the tabs 22, 24. Although the drawing illustrates that the end portion 26a protrudes at the negative electrode tab 24 side, the end portion 26a may protrude at the positive electrode tab 24 side.

According to the present disclosure, the leads 32, 34 of the electrode assembly 20 may be provided with a gripping element 28. In one implementation, the gripping element 28 may have a shape of a plurality of holes. The plurality of holes may be spaced apart from each other at the end of the negative electrode lead 34. Although the gripping element 28 is illustrated as being formed in the negative lead 34 in the drawings, the gripping element 28 may also be formed in the positive lead 32. The gripping element 28 may be formed by extending the length of the leads 32, 34. As will be described later, because the band element 26 has the end portion 26a (referred to hereinafter as an extended portion 26a) and the gripping element 28, which are pulled by the apparatus 100 for manufacturing the battery cell, the extended portion 26a and the gripping element 28 of the band element 26 are cut after the electrode assembly 20 is inserted into the casing 40.

According to the present disclosure, the casing 40 may have two open sides out of four sides thereof or may have a shape in which only about half of the circumference thereof is open. The electrode assembly 20 is inserted into the casing 40 through an open side 40a, and then the open side 40a is sealed. The casing 40 has a closed side 40b that is integrated with the casing 40 or pre-sealed. In one implementation, the closed side 40b may be continuously formed with other portions of the casing 40 from an initial stage.

The casing 40 includes an auxiliary portion 42. The auxiliary portion 42 may extend a predetermined length from the open side 40a of the casing 40. The auxiliary portion 42 may function as an electrolyte injection hole. The auxiliary portion 42 is removed during final sealing after injecting electrolyte.

In addition, the electrode assembly 20 may have opposite ends, each of which has a taping member 30 for finishing attached thereto.

Figure 3A:
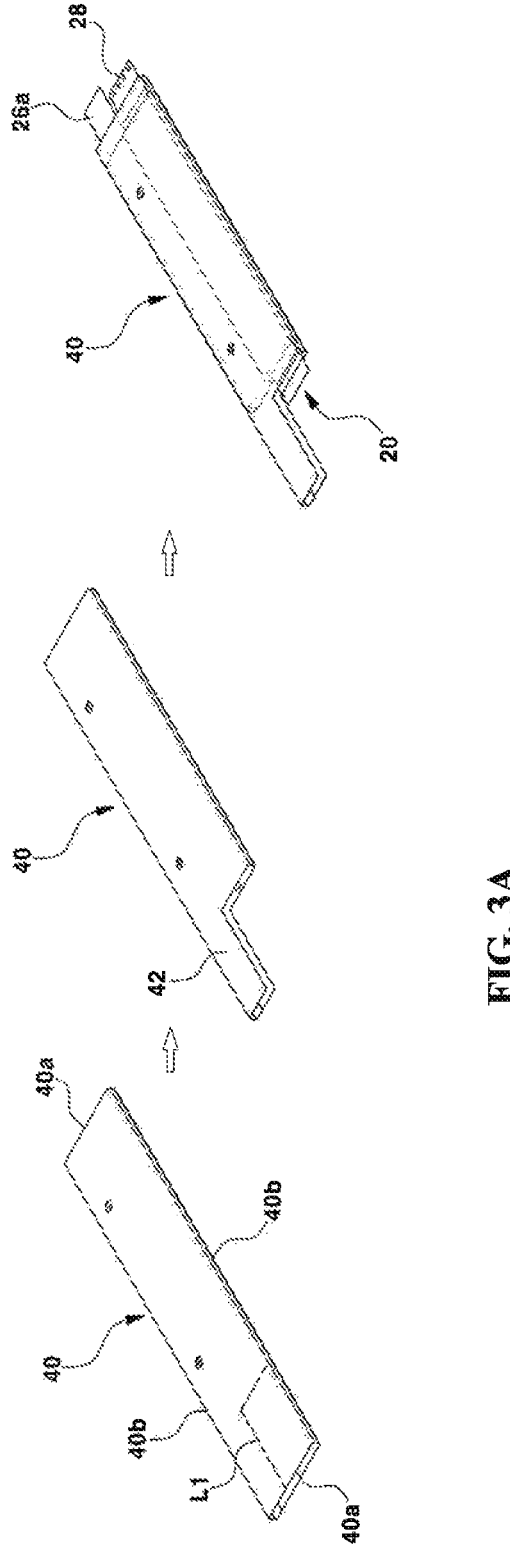
FIGS. 3A to 3C illustrate an example process of manufacturing the battery cell of FIG. 2.
Figure 3B:
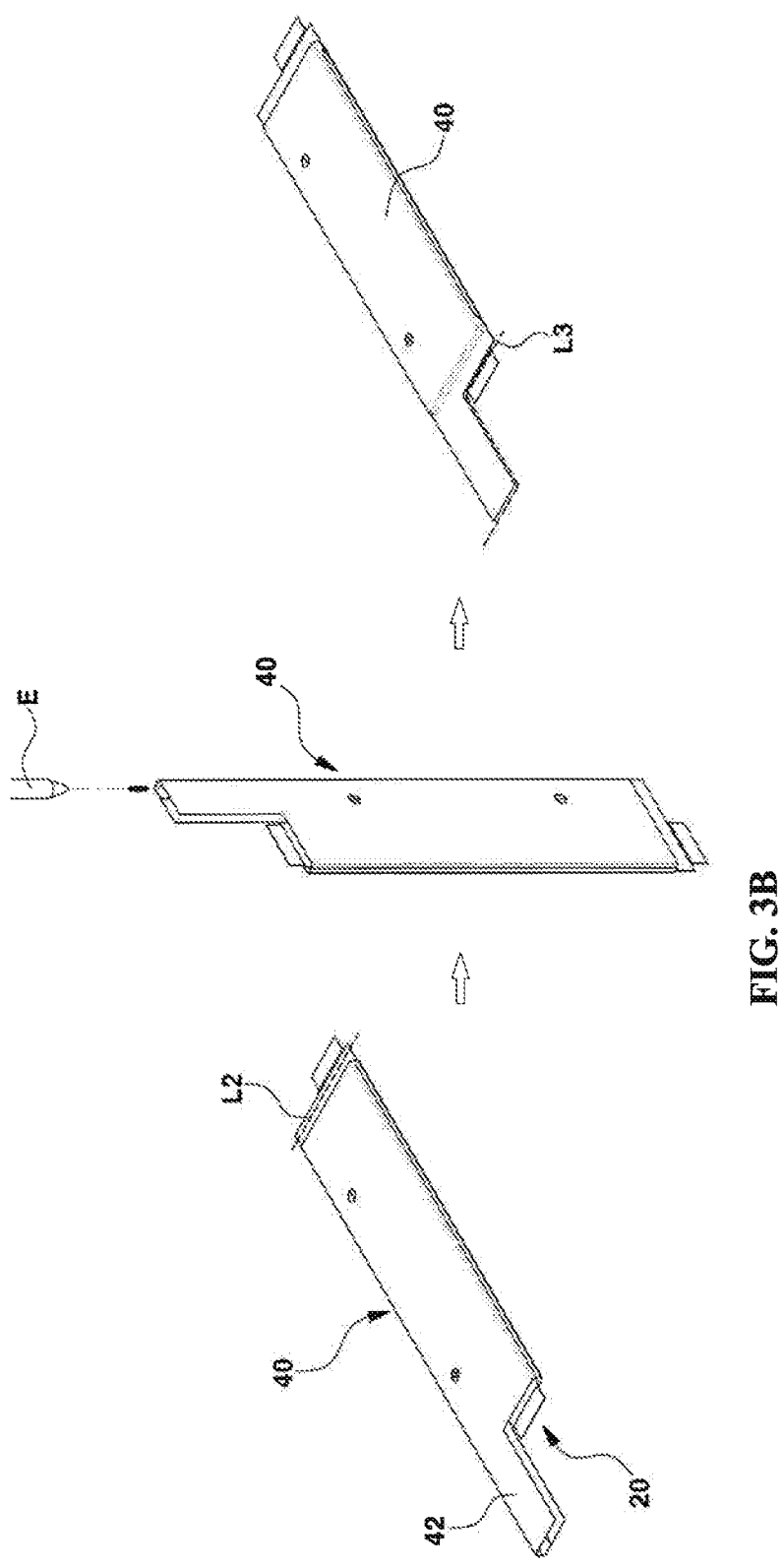
Figure 3C:
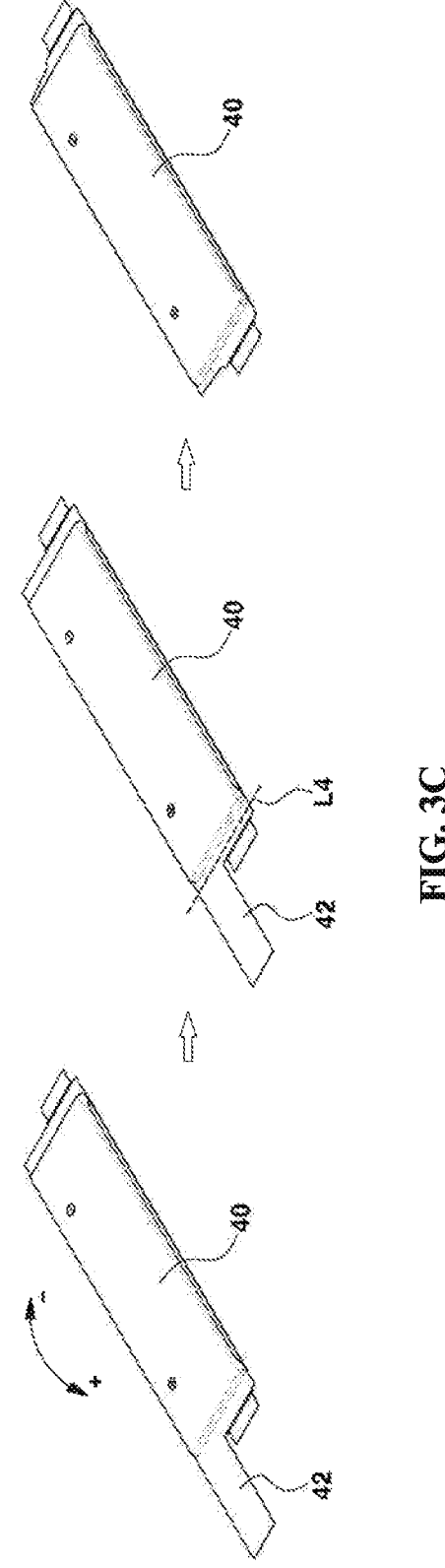

According to the present disclosure, a pouch-type battery cell may be assembled as follows. Referring to FIG. 3A, the casing 40 including two open sides 40a is prepared. One open side 40a of the casing 40 is provided with the auxiliary portion 42. The auxiliary portion 42 may be formed by cutting the casing 40 along a predetermined dotted line L1. Thereafter, the electrode assembly 20 is inserted into the casing 40 through the open side 40a. As illustrated in FIG. 3B, another open side 40a of casing 40 is sealed along a dotted line L2. Then electrolyte E is injected into the casing through the auxiliary portion 42. When injection of the electrolyte is completed, the circumference of the auxiliary portion 42 and the open side 40a with the auxiliary portion 42 are sealed along a dotted line L3. Thereafter, as illustrated in FIG. 3C, an activation process and a degassing process are performed on the cell, and then the auxiliary portion 42 and the open side 40a are sealed along a dotted line L4. Assembly of the cell is completed by cutting the auxiliary portion 42.

The apparatus 100 for manufacturing the battery cell according to the present disclosure may insert the electrode assembly 20 into the casing 40. Specifically, the apparatus 100 for manufacturing the battery cell may insert the electrode assembly 20 through the open side 40a, thereby enabling two-sided sealing instead of three-sided sealing.

Figure 4:
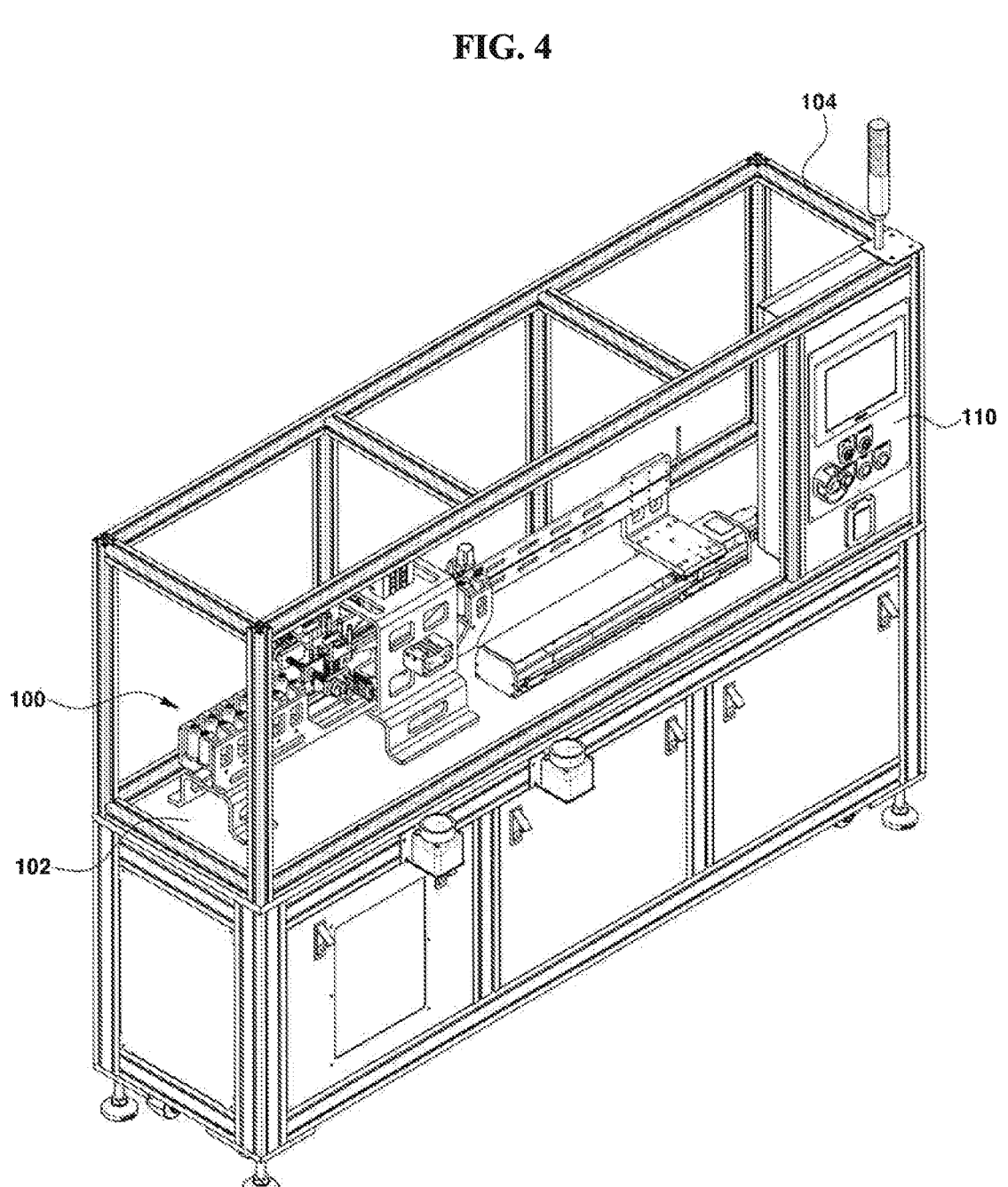
FIGS. 4 and 5 illustrate an example apparatus for manufacturing a battery cell according to an implementation of the present disclosure.

Referring to FIG. 4, the apparatus 100 for manufacturing the battery cell is disposed to be supported by a base 102. Under the base 102, components, such as an actuating element, a power supply, and the like, for the apparatus 100 for manufacturing the battery cell may be placed.

The apparatus 100 for manufacturing the battery cell includes a controller 110. The controller 110 may have a shape of a control panel and may control the operation of the apparatus 100 for manufacturing the battery cell. In one implementation, the controller 110 is disposed on a frame 104 defining a working space in the apparatus 100 for manufacturing the battery cell to facilitate manipulation of a worker.

Figure 5:
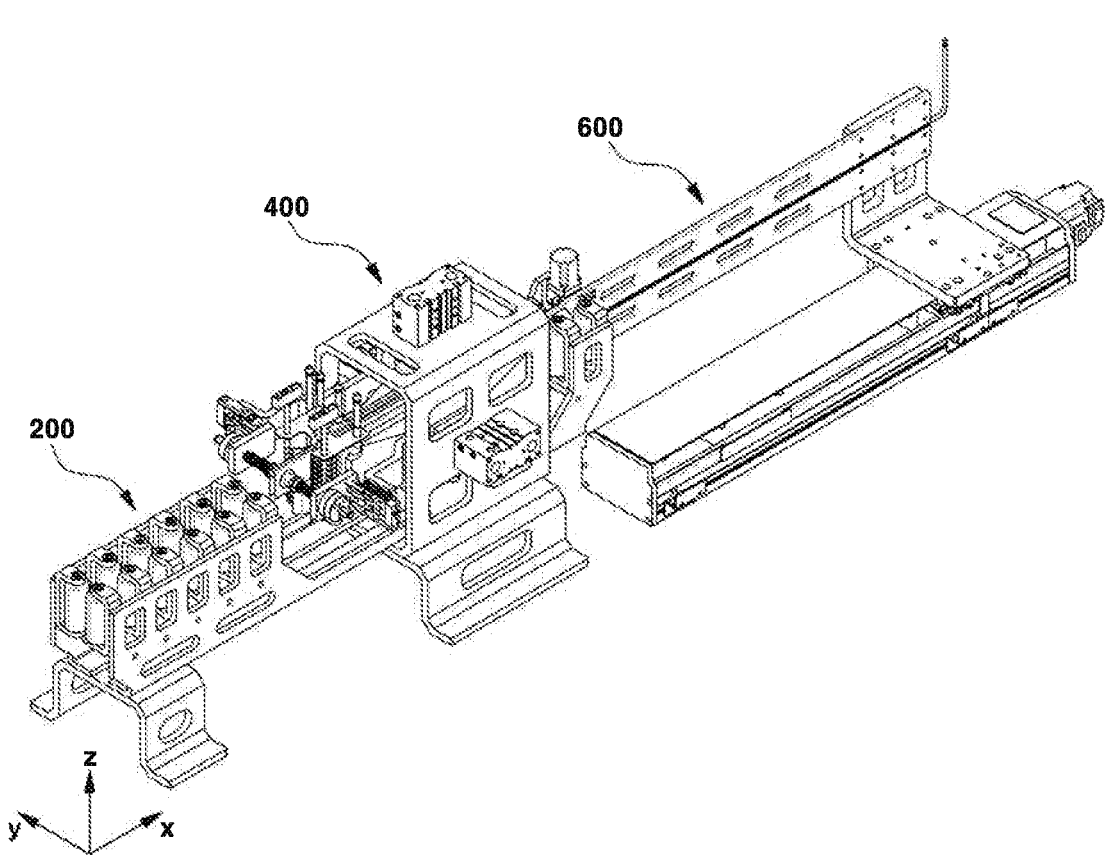

As illustrated in FIG. 5, the apparatus 100 for manufacturing the battery cell includes a guide unit 200, an expansion unit 400, and an insertion unit 600. The guide unit 200 is configured to move and guide the electrode assembly 20. The expansion unit 400 may expand the inner space of the casing 40. The insertion unit 600 is configured to insert electrode assembly 20 in the guide unit 200 into the casing 40 disposed in the expansion unit 400.

Figure 6A:
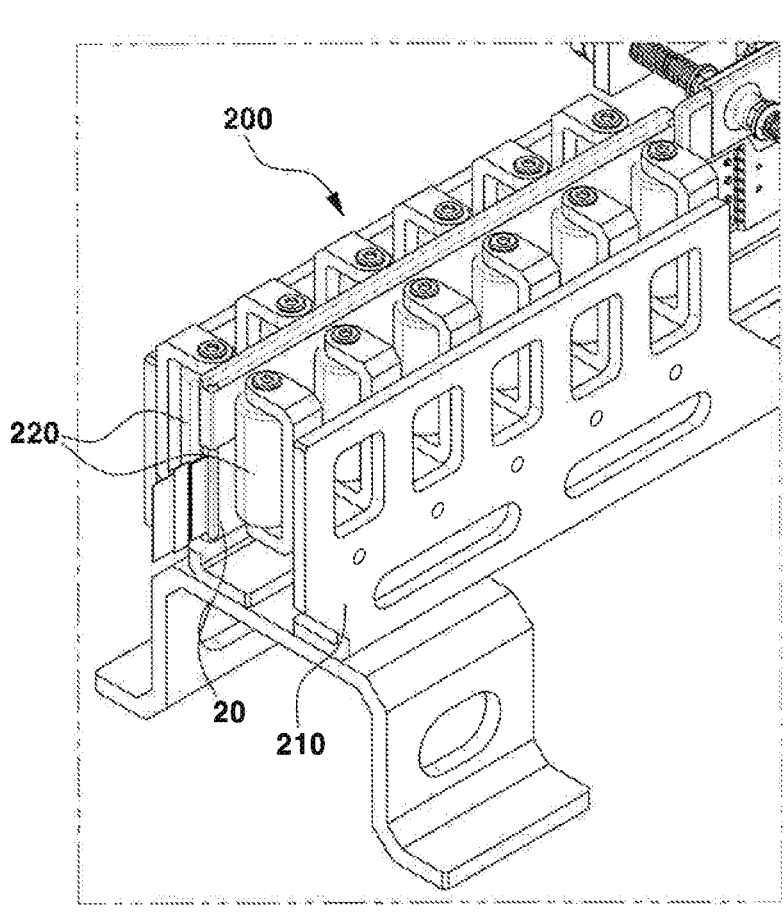
FIGS. 6A and 6B illustrate an example guide unit of an apparatus for manufacturing a battery cell according to an implementation of the present disclosure.

As illustrated in FIG. 6A, the guide unit 200 includes a holding frame 210. The holding frame 210 may have a plurality of side rolling elements 220 disposed in the movement direction of the electrode assembly 20 or in an x-axis direction. The side rolling elements 220 lightly press the electrode assembly 20 to maintain the thickness of the electrode assembly 20 to a minimum. In addition, the side rolling elements 220 may position the electrode assembly 20 in the center of the holding frame 210 so that the electrode assembly 20 is not biased in any direction within the holding frame 210. The side rolling elements 220 may guide the electrode assembly 20 to be inserted into the casing 40. The side rolling element 220 may be a roller made of a soft material.

Figure 6B:
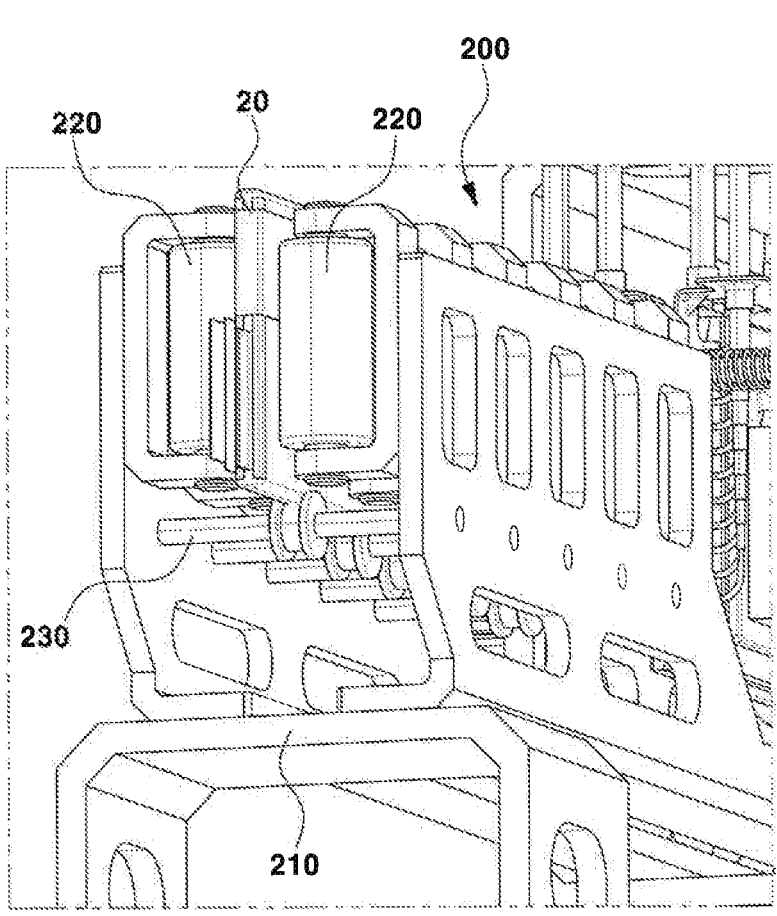

Referring to FIG. 6B, the holding frame 210 has a plurality of lower rolling elements 230 disposed thereon. The lower rolling elements 230 are provided under the side rolling elements 220. The lower rolling elements 230 may be disposed in the movement direction of the electrode assembly 20 or in the x-axis direction. The lower rolling elements 230 serve to support the electrode assembly 20. When the electrode assembly 20 is inserted into the casing 40, the lower rolling elements 230 may prevent the electrode assembly 20 from sagging in the direction of gravity or in a negative z-axis direction.

Figure 7:
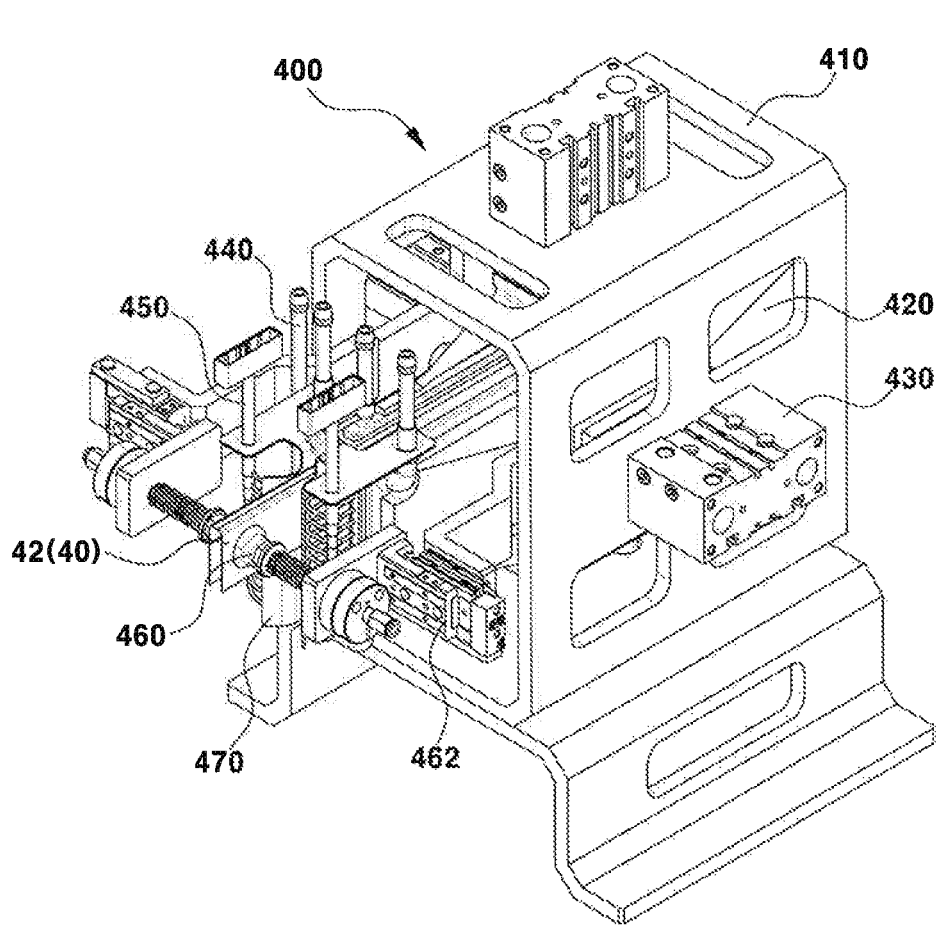
FIG. 7 illustrates an example expansion unit of an apparatus for manufacturing a battery cell according to an implementation of the present disclosure.

As illustrated in FIG. 7, the expansion unit 400 may position the casing 40 therein and expand the inner space of the casing 40 so that the electrode assembly 20 may smoothly enter the casing 40. The expansion unit 400 may include a tunnel structure 410.

Figure 8A:
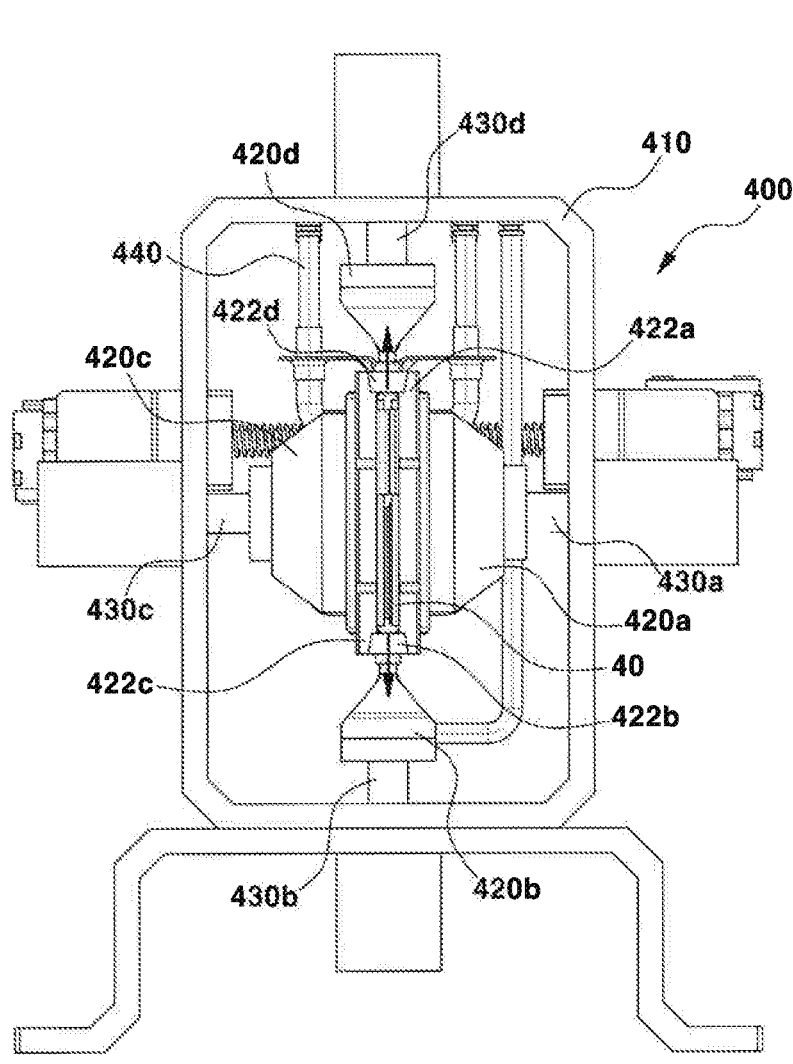
FIG. 8A is a front view of FIG. 7.
Figure 8B:
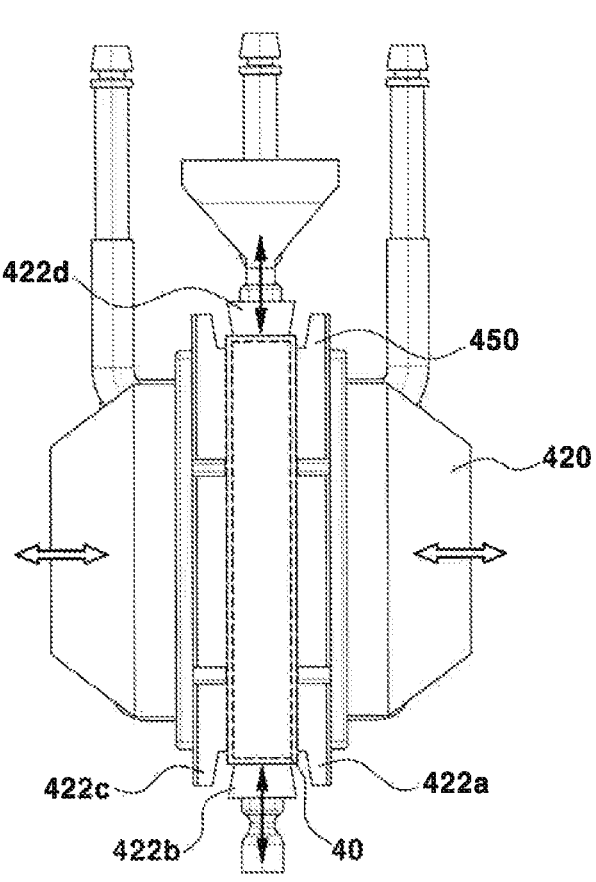
FIG. 8B is a partial view of FIG. 8A.

As illustrated in FIGS. 8A and 8B, the tunnel structure 410 is provided therein with a jig 420. In one implementation, the jig 420 may include four jigs 420a, 420b, 420c, 420d.

Each of first to fourth jigs 420a, 420b, 420c, 420d may move independently. To this end, according to an implementation of the present disclosure, the jigs 420a, 420b, 420c, 420d are provided with jig cylinders 430: 430a, 430b, 430c, and 430d, respectively. Each of the jig cylinders 430 provides driving force to move a corresponding one of the jigs 420 in a radial direction or towards or away from the tunnel structure 410. Here, the cylinder configured to move the jig 420 may be an electric cylinder but also be other type of actuator capable of performing the same function.

Each of the jigs 420 may adsorb a corresponding one of four sides except for the open sides 40a of the casing 40. The inner space of the casing 40 may be expanded through adsorption. To this end, according to an implementation of the present disclosure, the jigs 420 include adsorption plates 422: 422a, 422b, 422c, 422d, respectively.

Figure 9A:
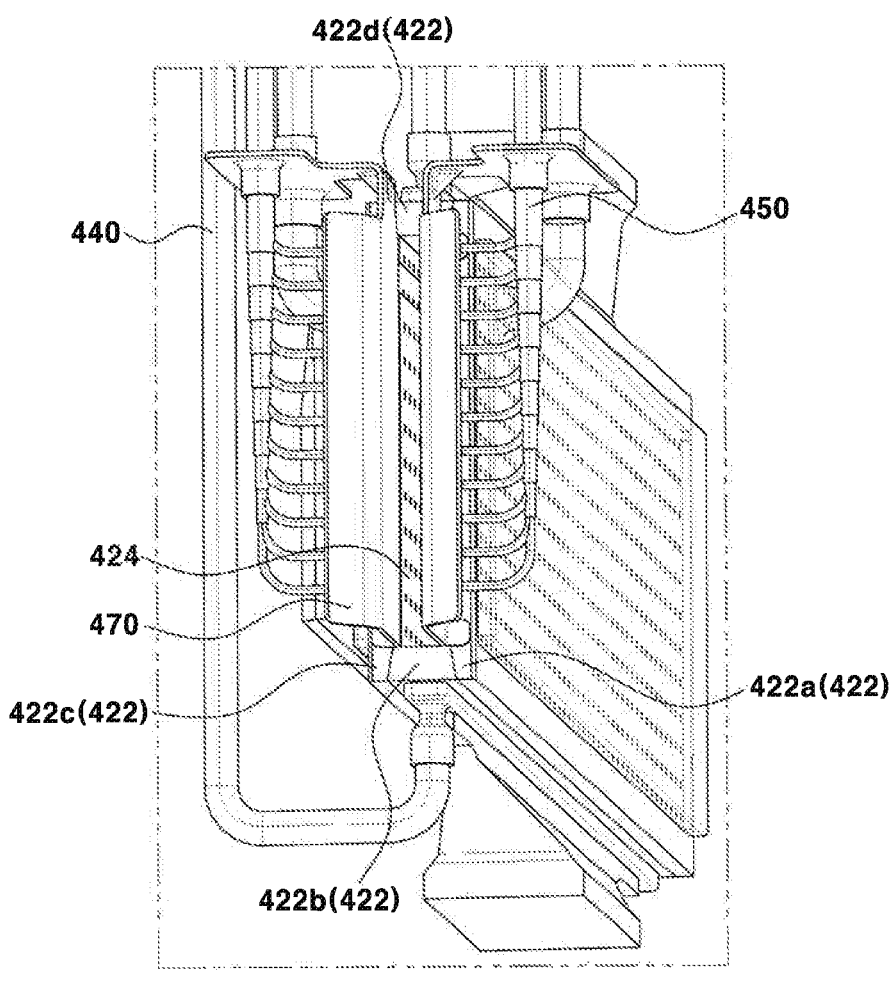
FIGS. 9A and 9B illustrate an example adsorption plate of an expansion unit of an apparatus for manufacturing a battery cell according to an implementation of the present disclosure.
Figure 9B:
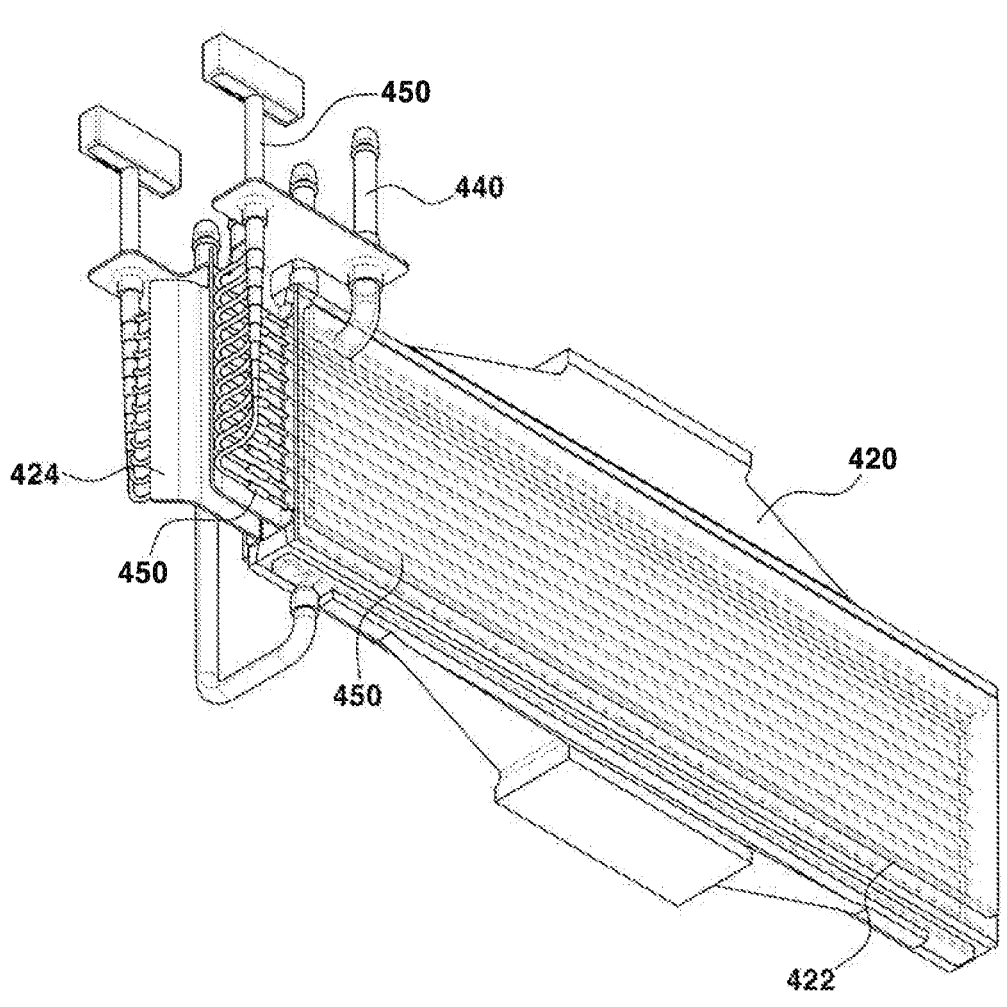

Each of the adsorption plates 422a, 422b, 422c, 422d is connected to a vacuum supply line 440 to vacuum-adsorb each side of the casing 40, thereby expanding the inner space of the casing 40. As illustrated in FIGS. 9A and 9B, each of the adsorption plates 422a, 422b, 422c, 422d may include a plurality of porous holes 424 to provide vacuum for adsorption of the casing 40.

In one implementation, the jig 420 may have one or more heating lines 450 provided therein. The heating line 450 may extend inside the jig 420. The heating line 450 may be provided in plural. The heating line 450 may heat the jig 420 to increase the temperature of the casing 40, thereby instantaneously increasing the elongation of the casing 40.

The expansion unit 400 may include an expansion guide 460. The expansion guide 460 may expand the auxiliary portion 42 of the casing 40 disposed in the expansion unit 400. The expansion guide 460 may grip the auxiliary portion 42 and allow the auxiliary portion 42 to move in a y-axis direction by a guide actuator 462, thereby expanding the auxiliary portion 42 of the casing 40.

The expansion unit 400 may include an entry guide 470. The entry guide 470 may facilitate entry of the electrode assembly 20 that is to be inserted into the casing 40. In one implementation, the entry guide 470 may be provided at an end portion of the expansion unit 400, facing the guide unit 200. The entry guide 470 may be provided in a pair, each having a shape of a flange spread to opposite sides.

Figure 10A:
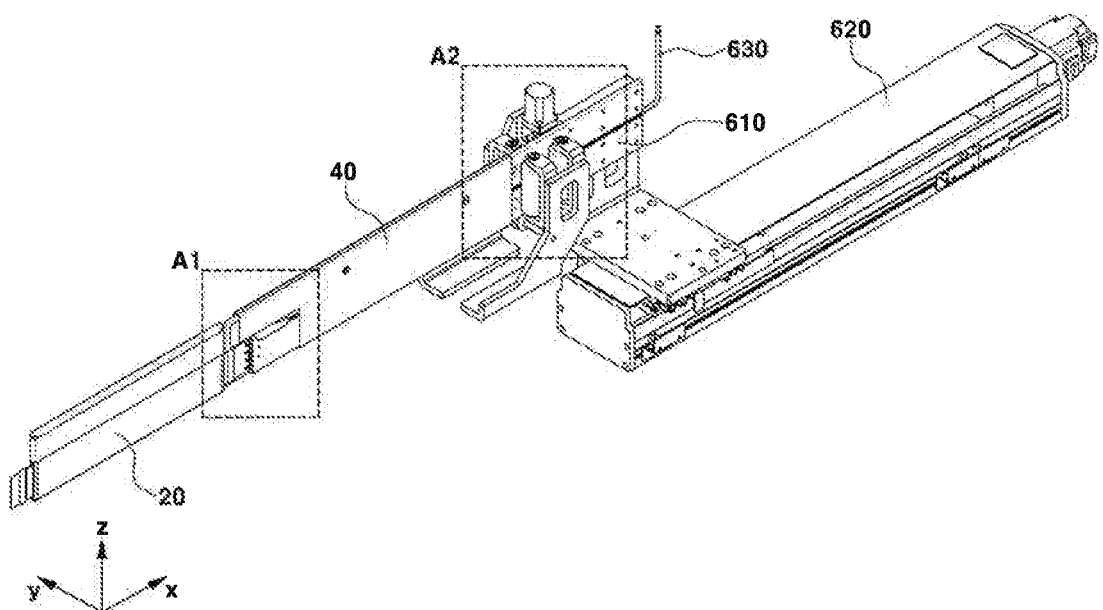
FIG. 10A illustrates an example state before an electrode assembly is inserted into a casing by an insertion unit of an apparatus for manufacturing a battery cell according to an implementation of the present disclosure.
Figure 10B:
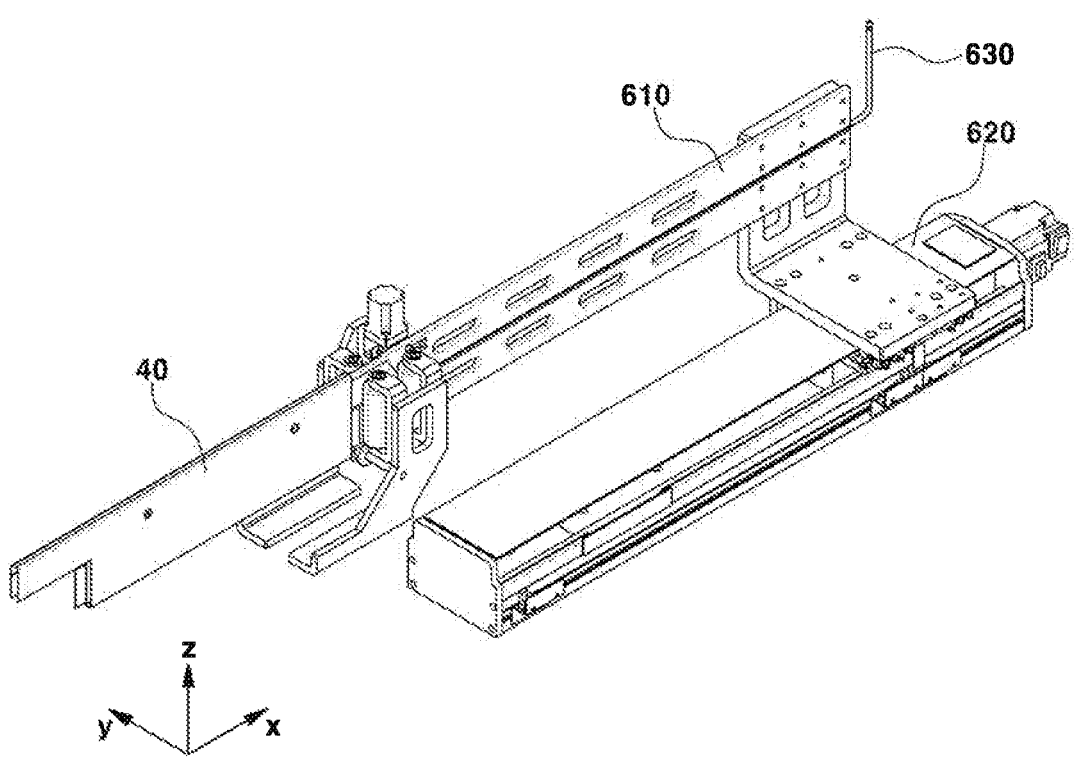
FIG. 10B illustrates an example state after an electrode assembly is inserted into a casing by an insertion unit of an apparatus for manufacturing a battery cell according to an implementation of the present disclosure.

As illustrated in FIGS. 10A and 10B, the insertion unit 600 performs a function of inserting the electrode assembly 20 disposed in the guide unit 200 into the casing 40 disposed in the expansion unit 400. FIG. 10A illustrates a state before the electrode assembly 20 is inserted into the casing 40, and FIG. 10B illustrates a state after the electrode assembly 20 is inserted into the casing 40.

The insertion unit 600 includes a slider 610 and an actuator 620. The slider 610 may pass through the casing 40 in the expansion unit 400 and grip the electrode assembly 20 disposed in the guide unit 200, and then insert the electrode assembly 20 into the casing 40. To this end, the slider 610 may be slidable in the x-axis direction by the actuator 620.

Figure 11A:
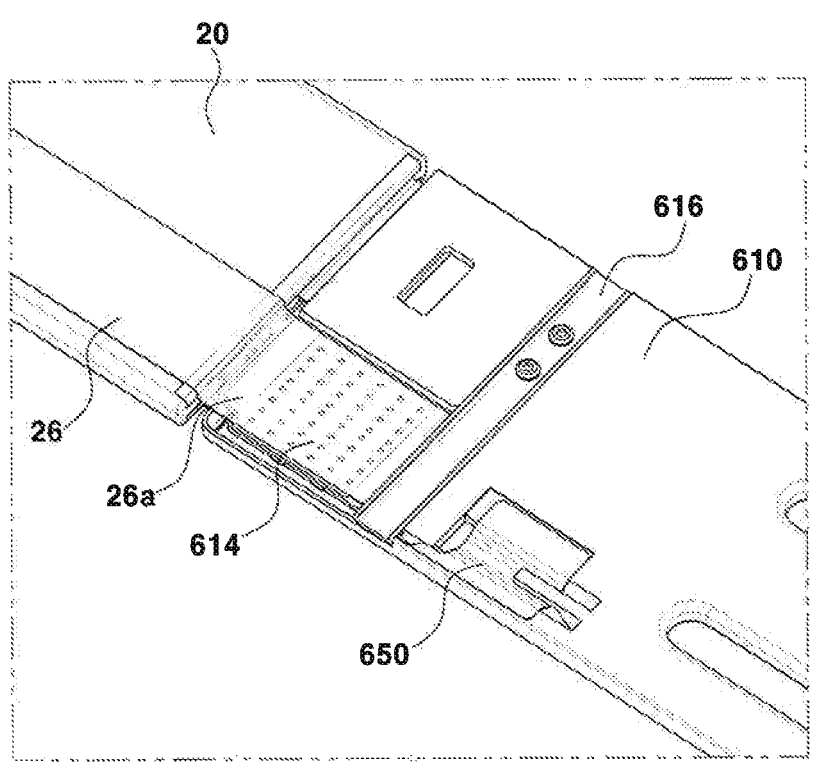
FIG. 11A illustrates an example first surface of a portion in which an electrode assembly is connected to an insertion unit of an apparatus for manufacturing a battery cell according to an implementation of the present disclosure (A1 of FIG. 10A)
Figure 11B:
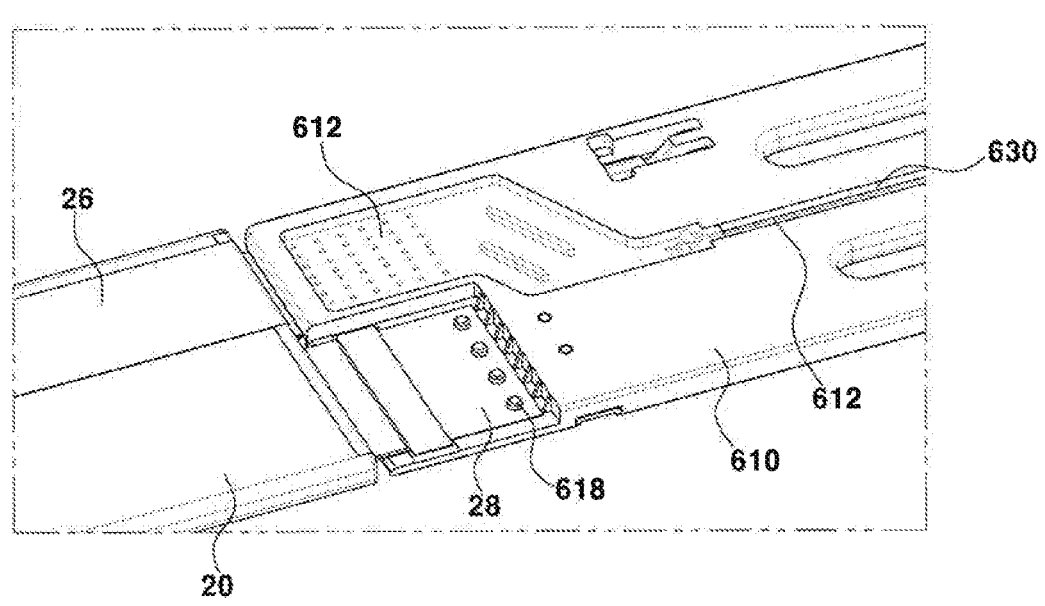
FIG. 11B is a rear surface of the first surface in FIG. 11A.

As illustrated in FIG. 11A, the slider 610 includes an adsorption portion 614. The adsorption portion 614 may adsorb and hold the extended portion 26a of the band element 26 of the electrode assembly 20. The adsorption portion 614 may be supplied with vacuum, as in FIG. 11B. The vacuum may be formed through a vacuum pipe 630 disposed along a groove 612 of the slider 610. Additionally, the slider 610 may have a fixing member 616 disposed thereon to provide additional fixing force to the extended portion 26a.

The adsorption portion 614 has a holder portion 618 provided next thereto. The holder portion 618 may fix the gripping element 28 of the electrode assembly 20. When the gripping element 28 has a shape of a hole, the holder portion 618 may have a shape of a protrusion that may be inserted into the hole. In this way, the slider 610 may transfer pulling force to the electrode assembly 20 by fixing the extended portion 26a and the gripping element 28.

Figure 12:
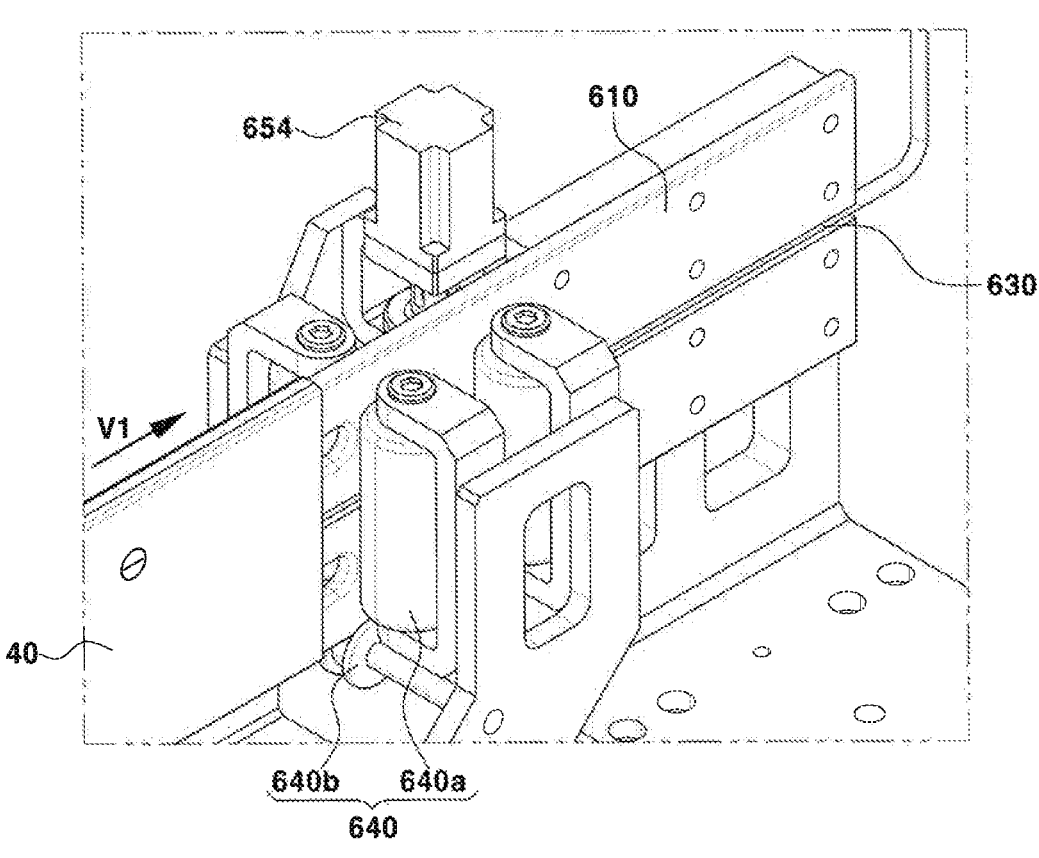
FIG. 12 illustrates an example slider guide of an insertion unit of an apparatus for manufacturing a battery cell according to an implementation of the present disclosure (A2 of FIG. 10A)

As illustrated in FIG. 12, the insertion unit 600 may include a slider guide 640. The slider guide 640 may guide the movement of the slider 610 and prevent the slider 610 from sagging. The slider guide 640 may include, for example, a side guide 640a and a lower guide 640b, like the side rolling element 220 and the lower rolling element 230 of the guide unit 200.

Figure 13A:
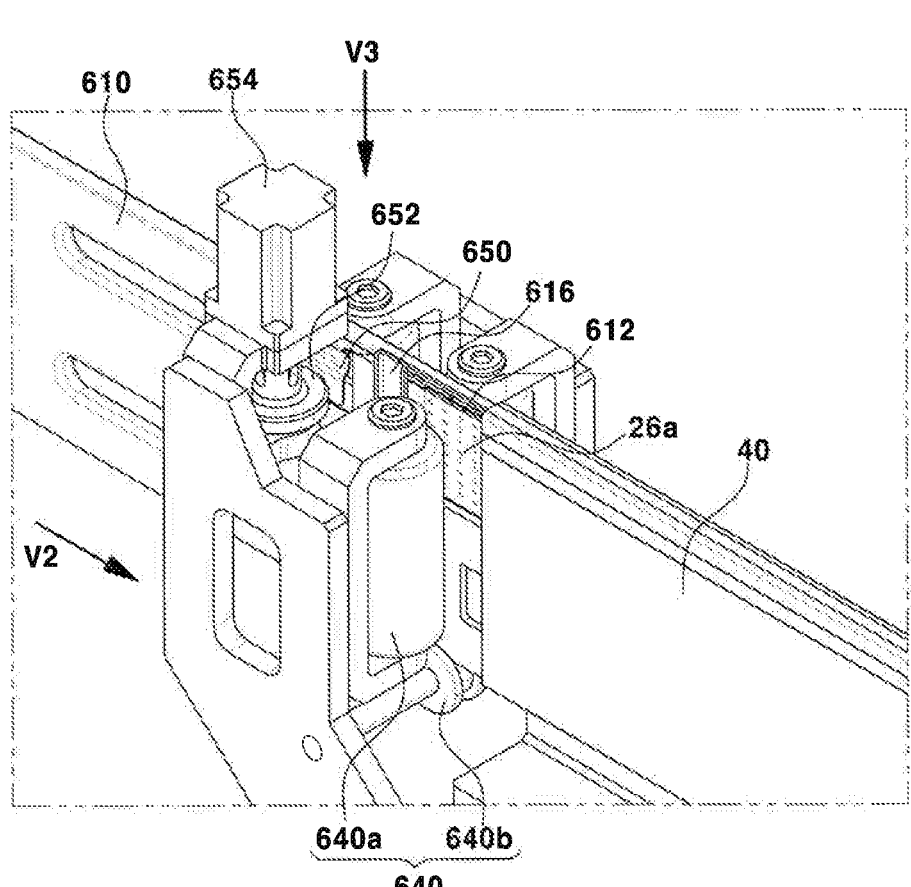
FIGS. 13A (viewed from V1 of FIG. 12), 13B (viewed from V2 of FIGS. 13A), and 13C and 13D (viewed from V3 of FIG. 13A) illustrate an example cutter of an apparatus for manufacturing a battery cell according to an implementation of the present disclosure.
Figure 13B:
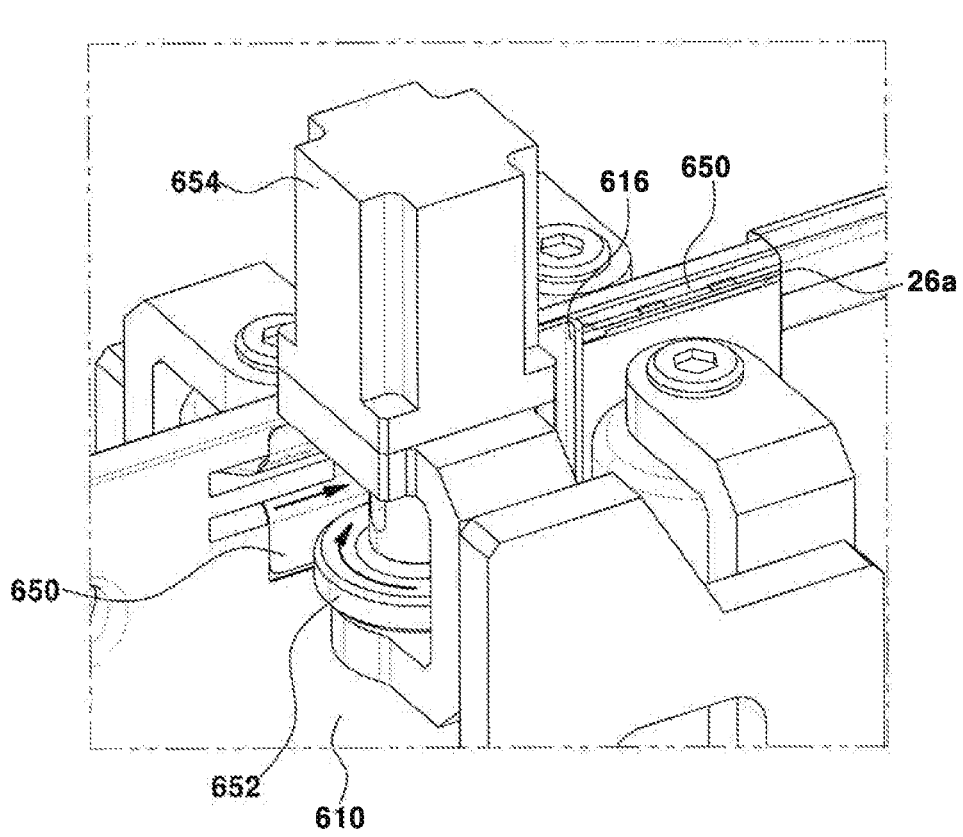
Figure 13C:
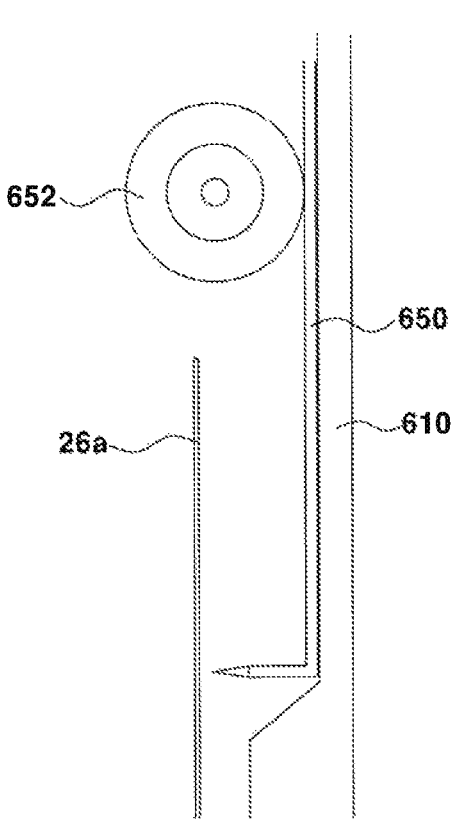
Figure 13D:
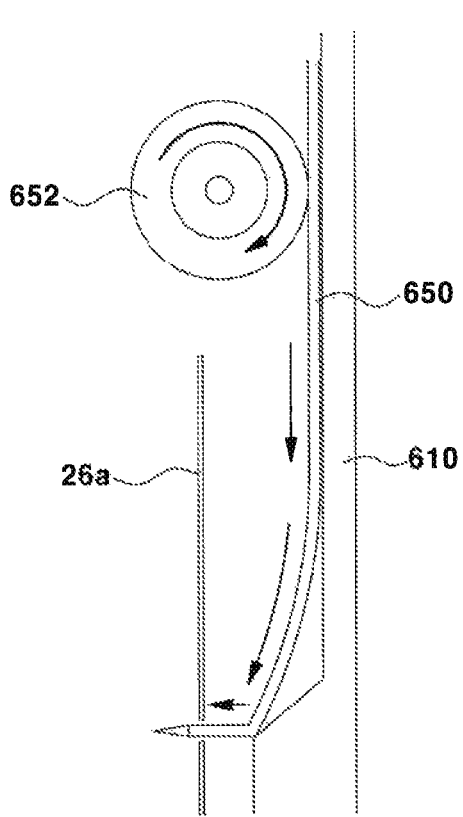

Referring to FIGS. 13A and 13B, the slider 610 may include a cutter 650. The cutter 650 may cut the extended portion 26a of the band element 26 after the electrode assembly 20 is inserted into the casing 40. According to an implementation of the present disclosure, the cutter 650 may be operable by a cutter gear 652 and a cutter actuator 654. The cutter gear 652 and the cutter actuator 654 may be mounted on the slider guide 640. As in FIGS. 13C and 13D, the cutter 650 is a blade having a wedge shape and may be moved by the cutter gear 652 to protrude towards the extended portion 26a.

Referring to FIGS. 14A to 14E, the operation of the apparatus 100 for manufacturing the battery cell according to the present disclosure will be described as a whole.

Figure 14A:
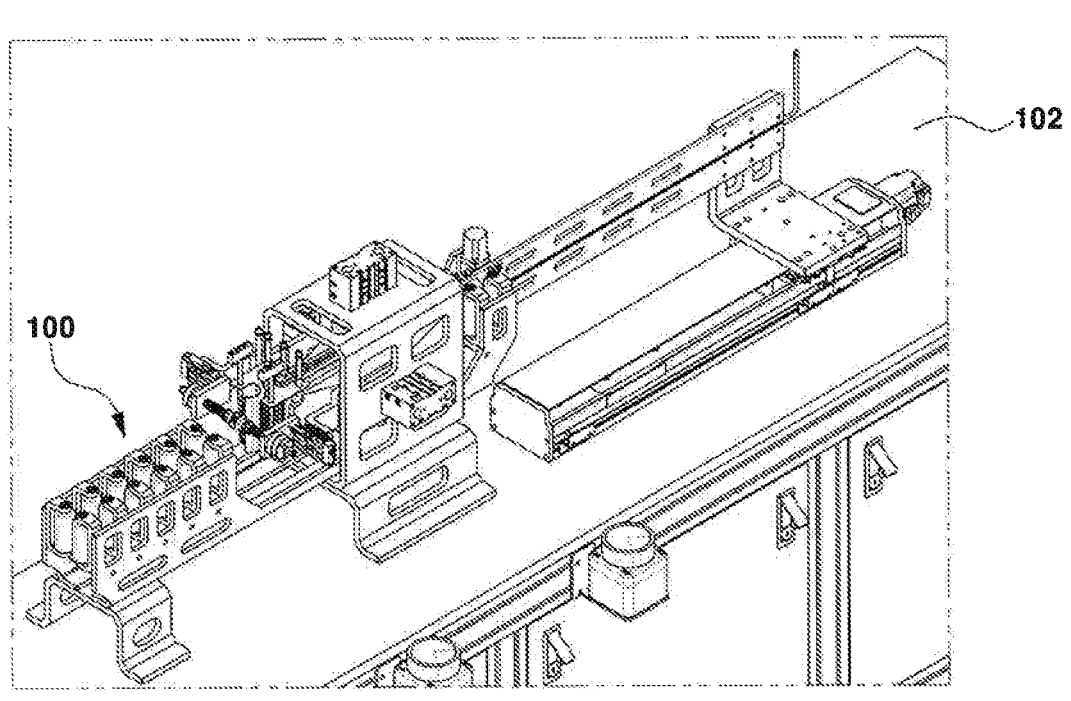
FIGS. 14A to 14E illustrate an example operating process of an apparatus for manufacturing a battery cell according to an implementation of the present disclosure.

In FIG. 14A, the apparatus 100 for manufacturing the battery cell is in a standby state.

Figure 14B:
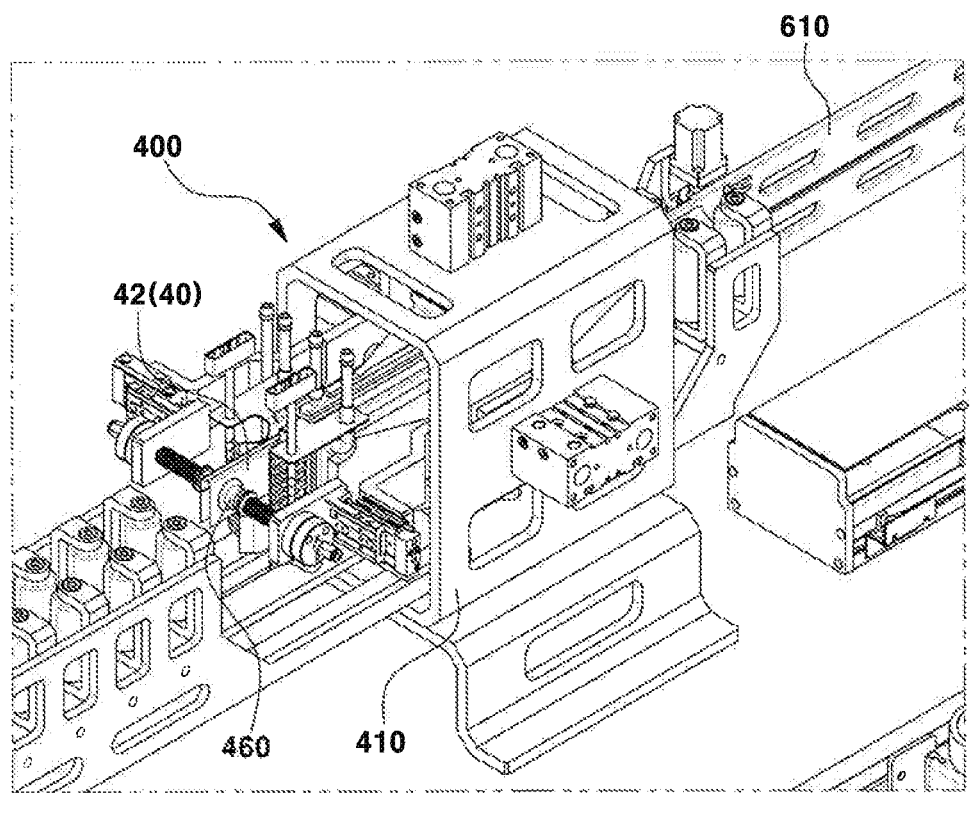
Figure 14C:
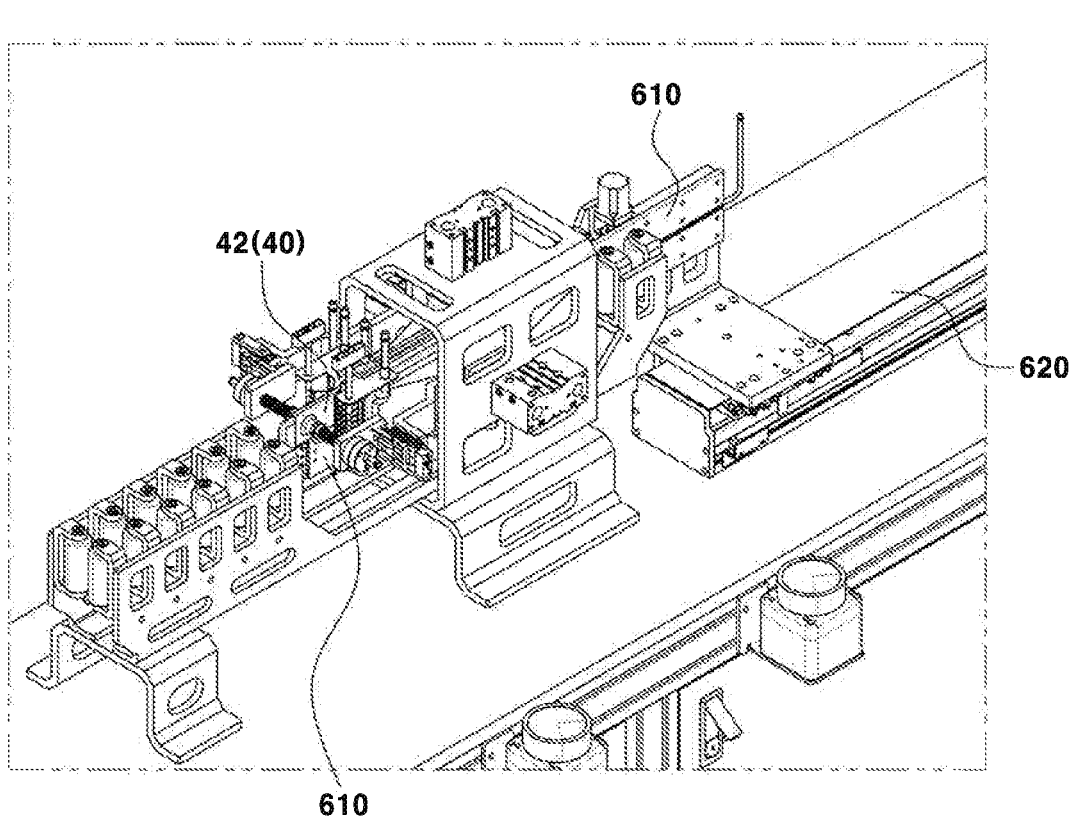

As in FIG. 14B, the casing 40 is put into the expansion unit 400. Then, as in FIG. 14C, the slider 610 moves in the x-axis direction by the actuator 620 and passes through the casing 40 disposed in the expansion unit 400.

Figure 14D:
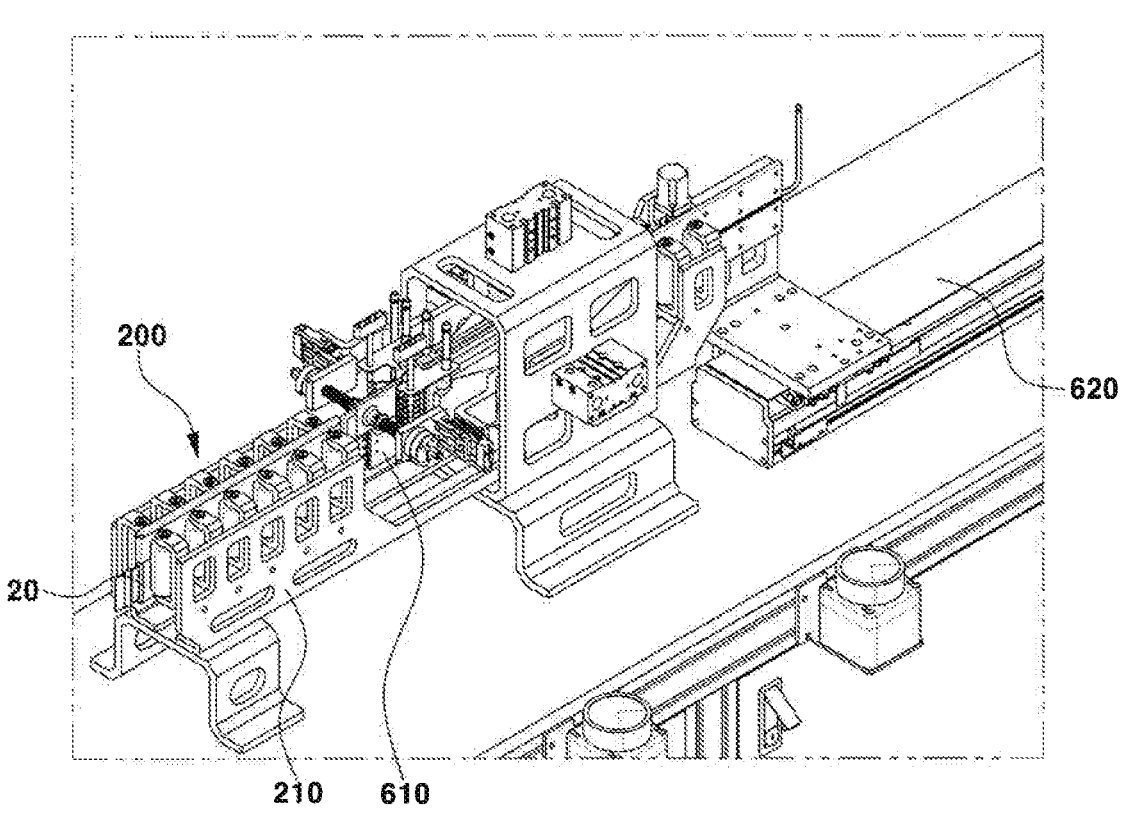
Figure 15A:
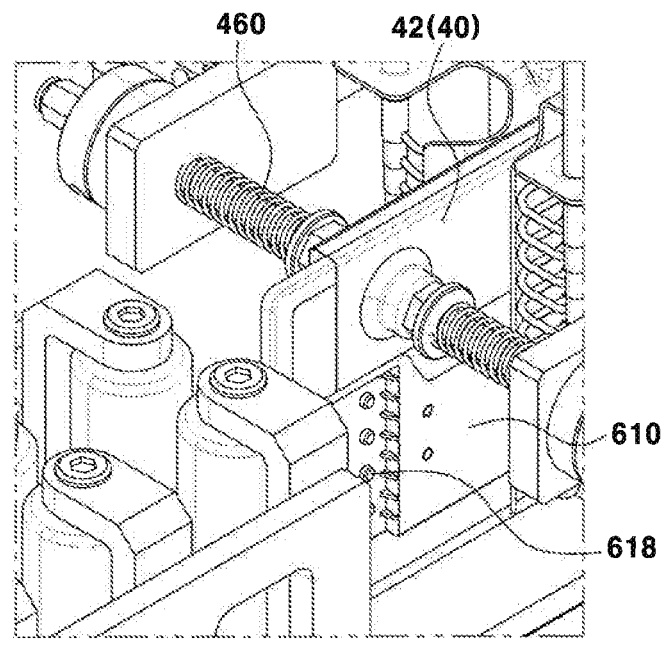
FIGS. 15A and 15B illustrate an example portion in which an electrode assembly is connected to an insertion unit of an apparatus for manufacturing a battery cell according to an implementation of the present disclosure.
Figure 15B:
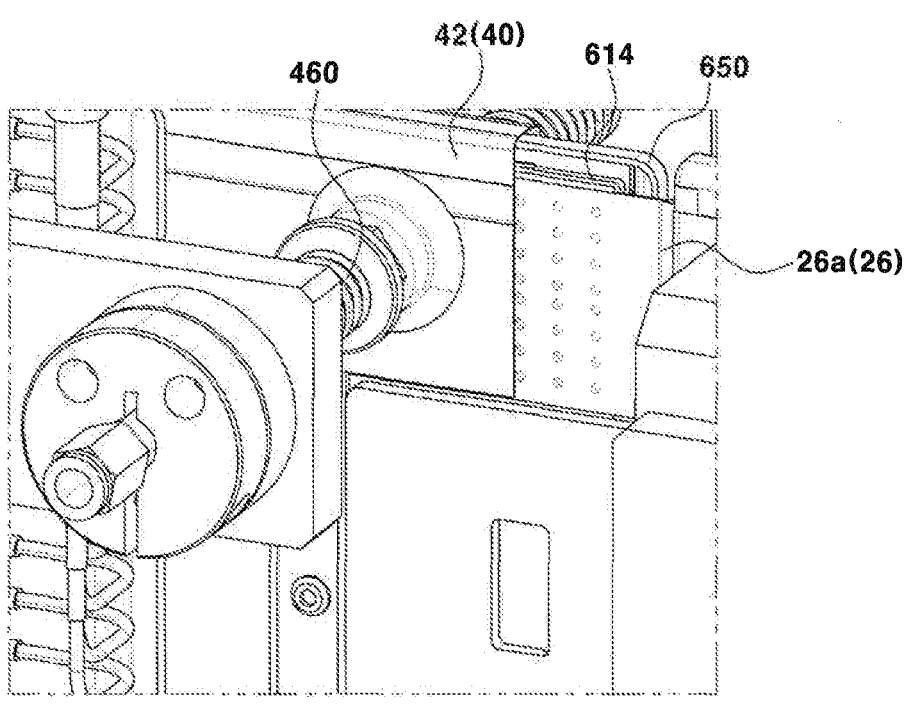

As in FIG. 14D, the electrode assembly 20 is disposed in the guide unit 200. The band element 26 and the gripping element 28 of the electrode assembly 20 are connected to the adsorption portion 614 and the holder portion 618 of the slider 610 (see FIGS. 15A and 15B additionally). Here, the jig 420 of the expansion unit 400 is heated by the heating line 450, and the inner space of the casing 40 is expanded by the adsorption plate 422.

Figure 14E:
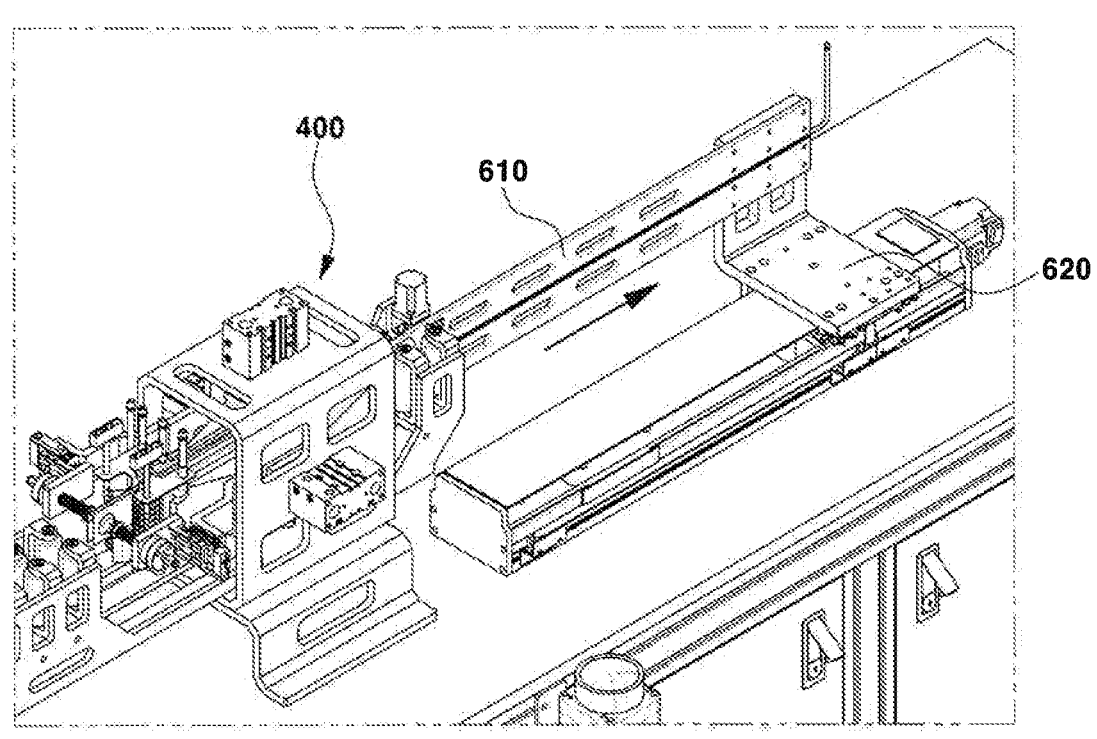

Next, as in FIG. 14E, the slider 610 is moved in the x-axis direction to insert the electrode assembly 20 into the casing 40. Then the extended portion 26a is cut by the cutter 650. The casing 40 into which the electrode assembly 20 is inserted is detached from the apparatus 100 for manufacturing the battery cell, thereby completing the insertion process. The cell in which the insertion process is completed is the figure on the right in FIG. 3A.

According to the present disclosure, because the upper edge portion of the cell may be additionally cooled compared to the related art three-sided sealing cell, a battery system optimized for fast charging may be realized.

In addition, because the area of the auxiliary portion 42 serving as a portion for degassing is small, the cost of disposal of the casing may be reduced.

As is apparent from the above description, the present disclosure can provide one or more of the following effects.

According to the present disclosure, an apparatus for manufacturing a battery cell can enable the manufacture of a battery cell having only two sealing sides.

According to the present disclosure, an apparatus for manufacturing a battery cell can reduce the possibility of electrolyte leakage by reducing the number of sealing sides.

According to the present disclosure, an apparatus for manufacturing a battery cell having increased cooling efficiency can be provided.

Effects of the present disclosure are not limited to the ones described above, and other effects not mentioned herein will be clearly recognized by those skilled in the art based on the above description.

It will be apparent to those of ordinary skill in the art to which the present disclosure pertains that the present disclosure described above is not limited by the above-described implementations and the accompanying drawings, and various substitutions, modifications and changes are possible within a range that does not depart from the technical idea of the present disclosure.

What is claimed is:

1. A battery cell comprising:
a casing having two open sides and an auxiliary portion;
an electrode assembly configured to be inserted into the casing, wherein the electrode assembly is formed by stacking a positive electrode with a positive electrode tab, a separator, and a negative electrode with a negative electrode tab; and
a band element that surrounds the electrode assembly and that comprises an extended portion.

2. The battery cell according to claim 1, wherein the electrode assembly further comprises a gripping element provided adjacent to the extended portion.

3. The battery cell according to claim 2, wherein the gripping element extends from any one of the positive electrode tab or the negative electrode tab.

4. An apparatus for manufacturing a battery cell, the apparatus being configured to insert the electrode assembly according to claim 2 into the casing and comprising:
a guide unit configured to have the electrode assembly disposed therein;
an expansion unit located adjacent to the guide unit and configured to have the casing disposed therein; and
an insertion unit connected to the electrode assembly and configured to insert the electrode assembly into the expansion unit.

5. The apparatus according to claim 4, wherein the guide unit comprises a plurality of side rolling elements configured to guide movement of the electrode assembly,
wherein the plurality of side rolling elements includes a first plurality of side rolling elements and a second plurality of side rolling elements, and
wherein the first plurality of side rolling elements and the second plurality of side rolling elements are disposed at opposing sides of the electrode assembly along a movement direction of the electrode assembly.

6. The apparatus according to claim 4, wherein the guide unit comprises a plurality of lower rolling elements disposed in a movement direction of the electrode assembly and configured to support a lower portion of the electrode assembly.

7. The apparatus according to claim 4, wherein the expansion unit comprises:

a jig configured to grip and expand a closed side of the casing; and a jig cylinder configured to provide movement force to the jig.

8. The apparatus according to claim 7, wherein the jig comprises an adsorption plate configured to vacuum-adsorb the closed side of the casing using vacuum supplied thereto.

9. The apparatus according to claim 7, wherein the expansion unit comprises a heating line configured to heat the jig.

10. The apparatus according to claim 4, wherein the expansion unit comprises:

an expansion guide configured to spread the auxiliary portion of the casing to opposite sides; and a guide actuator configured to provide driving force to the expansion guide.

11. The apparatus according to claim 4, wherein the expansion unit comprises an entry guide configured to guide entry of the electrode assembly.

12. The apparatus according to claim 11, wherein a cross-sectional area of the entry guide increases towards the guide unit.

13. The apparatus according to claim 4, wherein the insertion unit comprises:

a slider being slidable and configured to pass through the casing in the expansion unit to be connected to the electrode assembly in the guide unit; and an actuator configured to provide movement force to the slider.

14. The apparatus according to claim 13, wherein the slider comprises an adsorption portion configured to adsorb the extended portion of the casing.

15. The apparatus according to claim 14, further comprising a vacuum pipe mounted on the slider and configured to supply vacuum to the adsorption portion.

16. The apparatus according to claim 13, wherein the slider comprises a holder portion configured to grip the gripping element.

17. The apparatus according to claim 14, comprising a fixing member mounted on the slider to fix the extended portion.

18. The apparatus according to claim 13, wherein the insertion unit comprises a slider guide configured to support the slider.

19. The apparatus according to claim 13, wherein the insertion unit comprises a cutter, wherein the cutter is configured to cut the extended portion after the electrode assembly is inserted into the casing.

20. The apparatus according to claim 19, wherein the cutter protruding from the slider is configured to cut the extended portion and comprises:

a cutter gear configured to move the cutter with respect to the slider; and a cutter actuator configured to provide rotational force to the cutter gear.

* * * * *